US 6,674,548 B1

(12) United States Patent  (10) Patent No.: US 6,674,548 B1
Kanemitsu                  (45) Date of Patent:     Jan. 6, 2004

(54) FACSIMILE APPARATUS DETERMINING TYPE OF RECEIVED IMAGE TO SELECT PRINTING DEVICE (75) Inventor: Norio Kanemitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 07/842,082

(22) Filed: Feb. 26, 1992

(30) Foreign Application Priority Data

Feb. 26, 1991 (JP) .............................. 3-053966

(51) Int. Cl.⁷ .............................. H04N 1/00
(52) U.S. Cl. ................. 358/401; 358/467; 358/468
(58) Field of Search ................. 358/80, 75, 296, 358/298, 481, 442, 434, 462, 435, 436, 438, 439; 355/443, 447, 448, 453, 474, 401, 400, 467, 468; H04N 1/46

(56) References Cited

U.S. PATENT DOCUMENTS

| 4,194,221 A | | 3/1980 | Stoffel ........................ 358/283 |
| 4,318,134 A | | 3/1982 | Partridge et al. ............ 358/287 |
| 4,613,877 A | * | 9/1986 | Spencer et al. ............. 358/481 |
| 4,739,397 A | * | 4/1988 | Hayashi ...................... 358/80 |
| 4,782,399 A | * | 11/1988 | Sato ........................... 358/447 |
| 4,876,604 A | * | 10/1989 | Nobuta ....................... 358/400 |
| 4,926,268 A | * | 5/1990 | Kawamura et al. ......... 358/458 |
| 4,952,951 A | * | 8/1990 | Kumasaka et al. ......... 347/130 |
| 4,956,721 A | | 9/1990 | Tasaki et al. ............... 358/402 |
| 5,051,839 A | * | 9/1991 | Nakahara et al. ........... 358/401 |
| 5,172,244 A | | 12/1992 | Nakahara .................... 358/401 |
| 5,278,670 A | * | 1/1994 | Eschbach .................... 358/462 |

FOREIGN PATENT DOCUMENTS

| EP | 0 48 616 | 12/1987 | ............ H04N/1/40 |
| EP | 0 320 713 | 6/1989 | |
| FR | 2641927 | 7/1990 | ............ H04N/1/04 |
| JP | A62-225064 | 10/1987 | ............ H04N/1/40 |
| JP | 62-225064 | 10/1987 | ............ H04N/1/40 |
| JP | A1-182052 | 7/1989 | ............ H04N/1/46 |
| JP | 1-182052 | 7/1989 | ............ H04N/1/46 |
| JP | 2254852 | * 10/1990 | ............ H04N/1/00 |

OTHER PUBLICATIONS

User Guide of "TRI/O T500 and T1000" by Elite High Technology, Inc., 1990.
Advertisement Bill of "TRIO T500 and T1000", 1990.
Xerox Disclosure Bulletin, vol. 12, No. 2, Apr. 30, 1987, Stamforda (US), p. 65, C.S. Sellers et al., "Image Area Cover Analyzer", *the whole document*.
Patent Abstracts of Japan, vol. 14, No. 518 (E–1001) Nov. 14, 1990 & JP–A–22 15 268 (Matsushita Graphic Commun Syst Inc) Aug. 28, 1990 *abstract*.
Patent Abstracts of Japan, vol. 13, No. 465 (M–882)[3813], Oct. 20th, 1989; & JP–A–1 182 052 (Toshiba Corp.), Jul. 19, 1989 *Abstract*.

(List continued on next page.)

Primary Examiner—Jerome Grant, II
(74) Attorney, Agent, or Firm—Staas & Halsey LLP (57) ABSTRACT A facsimile apparatus includes: a unit for receiving image data and information on the type of the image data: There is at least one data output port each or which is connected with a first recording device; and/or at least one second recording device. The facsimile apparatus further includes a recording device determining unit which determines one recording device among the first recording device and the at least one second recording device, based on the information. A selector unit outputs the received image data, based on the determination by the recording device determining unit, through one of the at least one data output port corresponding to the first recording device, or to one of the at least one second recording device. The facsimile apparatus may contain an image type determining unit for examining the received image data to determine the type of image data, instead of receiving the above described information.

12 Claims, 10 Drawing Sheets

OTHER PUBLICATIONS

Patent Abstract of Japan, vol. 14, No. 584 (E–1018), Dec. 27th 1990; & JP–A–2 254 852 (Canon Inc.), Oct. 15, 1990 *Abstract*.

Patent Abstracts of Japan, vol. 14, No. 257 (E–936), Jun. 4th, 1990; & JP–A–2 076 462 (NEC Corp.), Mar. 15, 1990 *Abstract*.

User Guide of TRI/O T500 and T1000 by Elite High Technology, Inc. 1990, pp. 6–13.

* cited by examiner

FACSIMILE APPARATUS DETERMINING TYPE OF RECEIVED IMAGE TO SELECT PRINTING DEVICE

BACKGROUND OF THE INVENTION (1) Field of the Invention

The present invention relates to a facsimile apparatus having therein or connecting thereto a plurality of devices by which a received image is recorded on a paper, and the recorded paper is output to an operator. The devices may be, for example, a printer, a plotter, or the like.

(2) Description of the Related Art

Conventionally, a plurality of recording methods are known for facsimile apparatuses to record a received image on paper. One method is called a thermal recording, wherein thermal recording paper is used. The thermal recording paper is a rolled paper, and for example, has a length of two hundreds meters. The rolled paper of two hundreds meters length corresponds to seven hundreds sheets of A4 size cut paper. Another method is called a thermal transfer recording, wherein a transfer ribbon or a transfer film is used to transfer a received image onto a plain paper which is usually rolled. The other method is called a photo type printing, for example, a xerographic printing, wherein cut paper is used and photo type printing is carried out on the cut paper.

However, the above recording methods have the following drawbacks.

In the thermal recording, the rolled paper can be easily set in the facsimile apparatus, and a continuous printing is possible, but the quality of a recorded image is not good (low resolution of about 200 dpi), a color printing is impossible, and the preservability of thermal recording paper is not good.

In the thermal transfer recording, the preservability of the recording paper is good because plain paper is used, and the rolled paper can be easily set in the facsimile apparatus, but the quality of a recorded image is not good (low resolution of about 200 dpi).

In the photo type printing, the preservability of the recording paper is good because plain paper is used, the color printing is possible, the quality of the recorded image is good (resolution is 400 to 1,000 dpi), and the preservability of the recording paper is good because plain paper is used, but the number of sheets which can be set once is small, for example, 250 sheets, a paper jam may occur, and an image of a size larger than the size of the cut paper is impossible. In addition, a running cost for one recording sheet in the photo type printing is twice that of the thermal printing.

Further, a printing apparatus which allows both thermal printing and thermal transfer printing by attaching thereto or detaching therefrom a thermal transfer ink ribbon, is provided, but the quality of the recorded image is not good.

Japanese Patent Publication No.62-225064 (published on Oct. 3, 1987) discloses a facsimile apparatus containing a first recording portion usually recording and outputting image data, and a second recording portion recording and outputting image data with a different recording method from the first recording portion in response to a manual input from an operation panel. However, in this facsimile apparatus the operator must determine which recording portion to be used, and must manually operate the facsimile apparatus, before receiving the image data. That is, the operator on the transmitter side must notify the operator on the receiver side of which recording portion should be used, before transmitting the image data.

Japanese Patent Publication No.1-182052 (published on Jul. 19, 1989) discloses a facsimile apparatus containing a color recording portion, a monotone recording portion, a color/monotone determining portion, and a system control portion. The color/monotone determining portion may receive discrimination information indicating whether image data to be transmitted is color image data or monotone image data to determine whether the image data is color or monotone, or the determination is carried out based on whether or not the received image data contains a color difference component when no discrimination information is received. However, the disclosure of the technique for realizing the above determination based on the color difference component is not sufficient for a person in the art to understand or perform the determination.

Commercially available products named "TRI/O T500" and "TRI/O T1000" (manufactured by Elite High Technology, Inc., 1990) has functions of a command exchange, a MODEM, and a memory (hard disc). When an IBM personal computer AT, a scanner, and a printer is connected to the apparatus "TRI/O T500" or "TRI/O T1000", a facsimile text received by the apparatus "TRI/O T500" or "TRI/O T1000" can be output from the printer (facsimile receiving function); an image data input from the scanner can be transmitted through the apparatus "TRI/O T500" or "TRI/O T1000" by facsimile communication (facsimile transmitting function); and image data input from the scanner can be output from the printer through the apparatus "TRI/O T500" or "TRI/O T1000" (copy function). Namely, the above apparatus "TRI/O T500" or "TRI/O T1000" is a facsimile MODEM having data ports which can be connected with a personal computer, a scanner, and a printer. However, the above apparatuses cannot operate without a personal computer connected thereto. Namely, the operation is carried out under control of the personal computer.

SUMMARY OF THE INVENTION

An object of the present invention is to provide a facsimile apparatus wherein an optimum paper-recording method can be automatically selected according to a type of a received image, to improve economical and practical efficiency.

According to the first aspect of the present invention, there is provided a facsimile apparatus, comprising: a communication unit for receiving and transmitting image data and information on a type of the image data; a plurality of data output ports each for allowing a connection with a recording device to pass therethrough image data so that the image data is supplied to the recording device; a recording device determining unit for receiving the information and determining one of the recording devices which can be connected to the plurality of data output ports, as a recording device by which the received image data is to be recorded, based on the information; and a selector unit for outputting the image data received by the communication unit through one of the data output ports corresponding to the recording device determined by the recording device determining unit.

According to the second aspect of the present invention, there is provided a facsimile apparatus, comprising: a communication unit for receiving and transmitting image data and information on a type of the image data; a plurality of data recording devices each for recording the image data received by the communication unit when the data recording device receives the image data; a recording device determining unit for receiving the information and determining one of the recording devices, as a recording device by which the image data is to be recorded, based on the information; and a selector unit for transferring the image data received by the communication unit to the recording device determined by the recording device determining unit.

According to the third aspect of the present invention, there is provided a facsimile apparatus, comprising: a communication unit for receiving and transmitting image data and information on a type of the image data; at least one data output port each for allowing a connection with a first recording device to pass therethrough image data so that the image data is supplied to the first recording device; at least one second data recording device each for recording the image data received by the communication unit when the second recording device receives the image data; a recording device determining unit for receiving the information and determining one recording device among the first recording device which can be connected to the at least one data output port, and the at least one second recording device, based on the information; and a selector unit for outputting the image data received by the communication unit, based on the determination by the recording device determining unit, through one of the at least one data output port corresponding to the first recording device, or to one of the at least one second recording device.

In the above constructions of the first, second, and third aspects of the present invention, the above information indicates whether the image data is color data or monochrome data.

In the above constructions of the first, second, and third aspects of the present invention, the above information indicates a quality level of the image data.

According to the fourth aspect of the present invention, there is provided a facsimile apparatus comprising: a communication unit for receiving and transmitting image; a plurality of data output ports each for allowing a connection with a recording device to pass therethrough image data so that the image data is supplied to the recording device; an image type determining unit for examining the image data received by the communication unit to determine a type of the image data; a recording device determining unit for receiving the information and determining one of the recording devices which can be connected to the plurality of data output ports, based on the type of the image data determined by the image data determining unit; and a selector unit for outputting the image data received by the communication unit through one of the data output ports corresponding to the recording device and determined by the recording device determining unit.

According to the fifth aspect of the present invention, there is provided a facsimile apparatus comprising: a communication unit for receiving and transmitting image data; a plurality of data recording devices each for recording the image data received by the communication unit when the data recording device receives the image data; an image type determining unit for examining the image data received by the communication unit to determine the type of the image data; a recording device determining unit for receiving the information and determining one of the recording devices, as a recording device by which the image data is to be recorded, based on the type of the image data determined by the image data determining unit; and a selector unit for transferring the image data received by the communication unit to the recording device determined by the recording device determining unit.

According to the sixth aspect of the present invention, there is provided a facsimile apparatus, comprising: a communication unit for receiving and transmitting image data; at least one data output port each for allowing a connection with a first recording device to pass therethrough image data so that the image data is supplied to the first recording device; at least one second data recording device each for recording the image data received by the communication unit when the second recording device receives the image data; an image type determining unit for examining the image data received by the communication unit to determine a type of the image data; a recording device determining unit for receiving the information and determining one recording device among the first recording device which can be connected to the at least one data output port, and the at least one second recording device, based on the type of the image data determined by the image data determining unit; and a selector unit for outputting the image data received by the communication unit, based on the determination by the recording device determining unit, through one of the at least one data output port corresponding to the first recording device, or to one of the at least one second recording device.

In the above constructions of the fourth, fifth, and sixth aspects of the present invention, the above image type determining unit determines a quality level of the image data as the type of the image data.

DESCRIPTION OF THE PREFERRED EMBODIMENTS

Basic Operations of the Present Invention (FIGS. 1, 2, 3, 4, 5, and 6)

Figure 1:
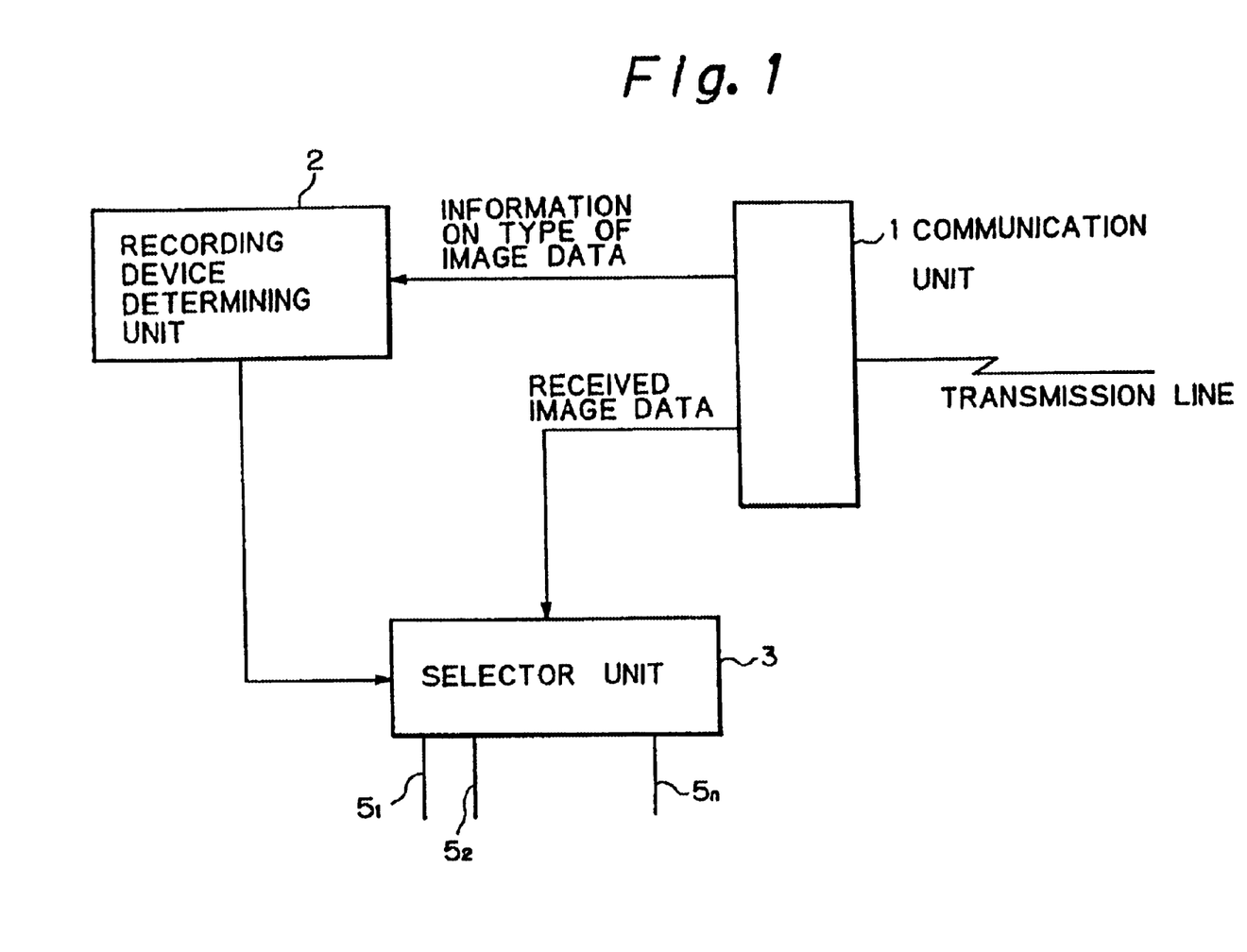
FIG. 1 is a diagram illustrating the basic construction of the facsimile apparatus according to the first aspect of the present invention.

FIG. 1 is a diagram illustrating the basic construction of the facsimile apparatus according to the first aspect of the present invention. In FIG. 1, reference numeral 1 denotes a communication unit, 2 denotes a recording device determining unit, 3 denotes a selector unit, and $5i$ (i=1 to n) each denote a data output port for allowing a connection with a recording device (not shown) to pass therethrough image data, so that the image data is supplied to the recording device. The functions of these units are described in the SUMMARY OF THE INVENTION. Image data and the information on the type of the image data are received by the communication unit 1, and the recording device determining unit 2 determines one of the recording devices which can be connected to the plurality of data output ports $5i$, based on the received information. Then, the selector unit 3 outputs the image data received by the communication unit 1 through one of the data output ports $5i$ corresponding to the recording device identified by the recording device determining unit 2. Thus, the received,image data can be recorded by the recording device identified by the recording device determining unit 2.

Figure 2:
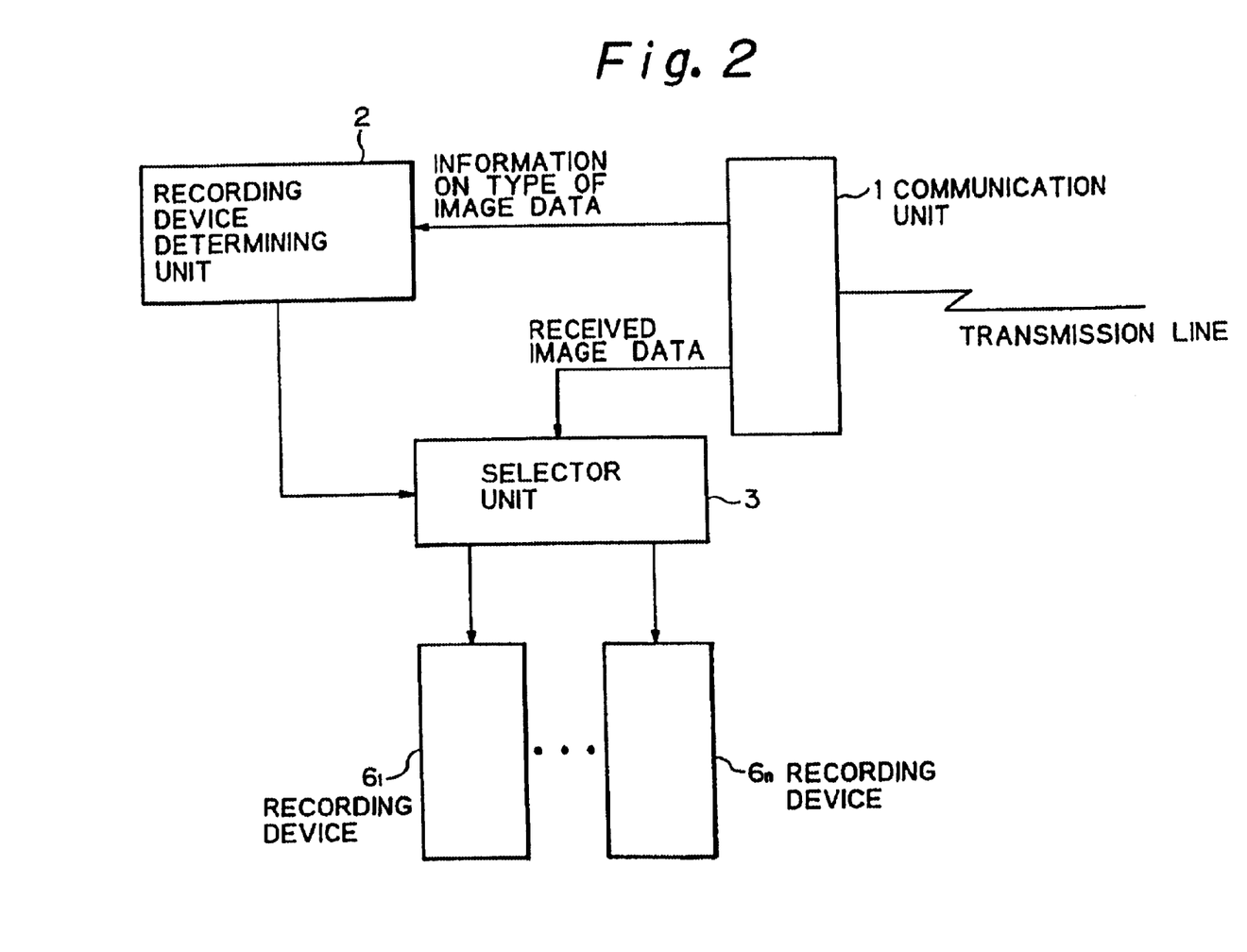
FIG. 2 is a diagram illustrating the basic construction of the facsimile apparatus according to the second aspect of the present invention.

FIG. 2 is a diagram illustrating the basic construction of the facsimile apparatus according to the second aspect of the present invention. In FIG. 2, reference numerals $6i$ (i=1 to n) each denote a data recording device for recording the image data received by the communication unit when the data recording device receives the image data. As indicated in FIG. 2, the facsimile apparatus according to the second aspect of the present invention has a construction similar to that of the facsimile apparatus according to the first aspect of the present invention. The functions of the respective units in the construction of the second aspect of the present invention are described in the SUMMARY OF THE INVENTION. Image data and the information on the type of the image data are received by the communication unit 1, and the recording device determining unit 2 determines one of the recording devices, as a recording device by which the image data is to be recorded, based on the received information. Then, the selector unit 3 transfers the image data received by,the communication unit 1 to the recording device identified by the recording device determining unit 2. Thus, the received image data, can be recorded by the recording device identified by the recording device determining unit 2.

Figure 3:
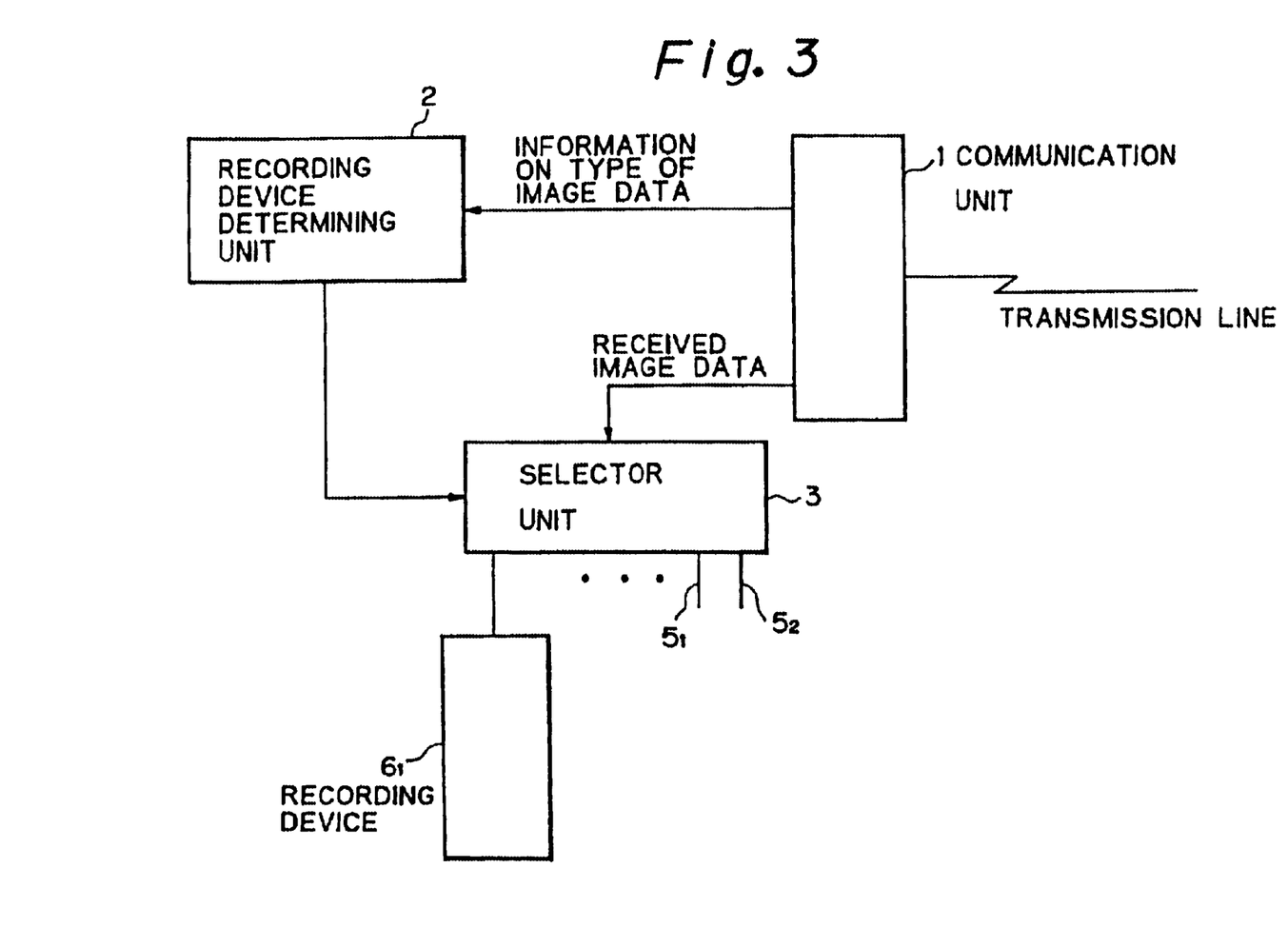
FIG. 3 is a diagram illustrating the basic construction of the facsimile apparatus according to the third aspect of the present invention.

FIG. 3 is a diagram illustrating the basic construction of the facsimile apparatus according to the third aspect of the present invention. In FIG. 3, reference numerals $5i$ (i=1 to n) each denote a data output port for allowing a connection with a first recording device to pass therethrough image data so that the image data is supplied to a first recording device (not shown), and $6_1$ denotes a second recording device for recording the image data received by the communication unit 1 when the second recording device receives the image data. As indicated in FIG. 3, the facsimile apparatus according to the third aspect of the present invention has a construction similar to that of the facsimile apparatuses according to the above first and second aspects of the present invention. The functions of the respective units in the construction of the third aspect of the present invention are described in the SUMMARY OF THE INVENTION. Image data and the information on the type of the image data are received by the communication unit 1, and the recording device determining unit 2 identifies one recording device among the first recording device which can be connected to the at least one data output port $5i$, and the at least one second recording device, based on the received information. Then, the selector unit 3 outputs the image data received by the communication unit 1, based on the determination by the recording device determining unit 2, through one of the at least one data output port $5i$ corresponding to the first recording device, or to one of the at least one second recording device. Thus, the received image, data can be recorded by the recording device identifies by the recording device determining unit 2.

Figure 4:
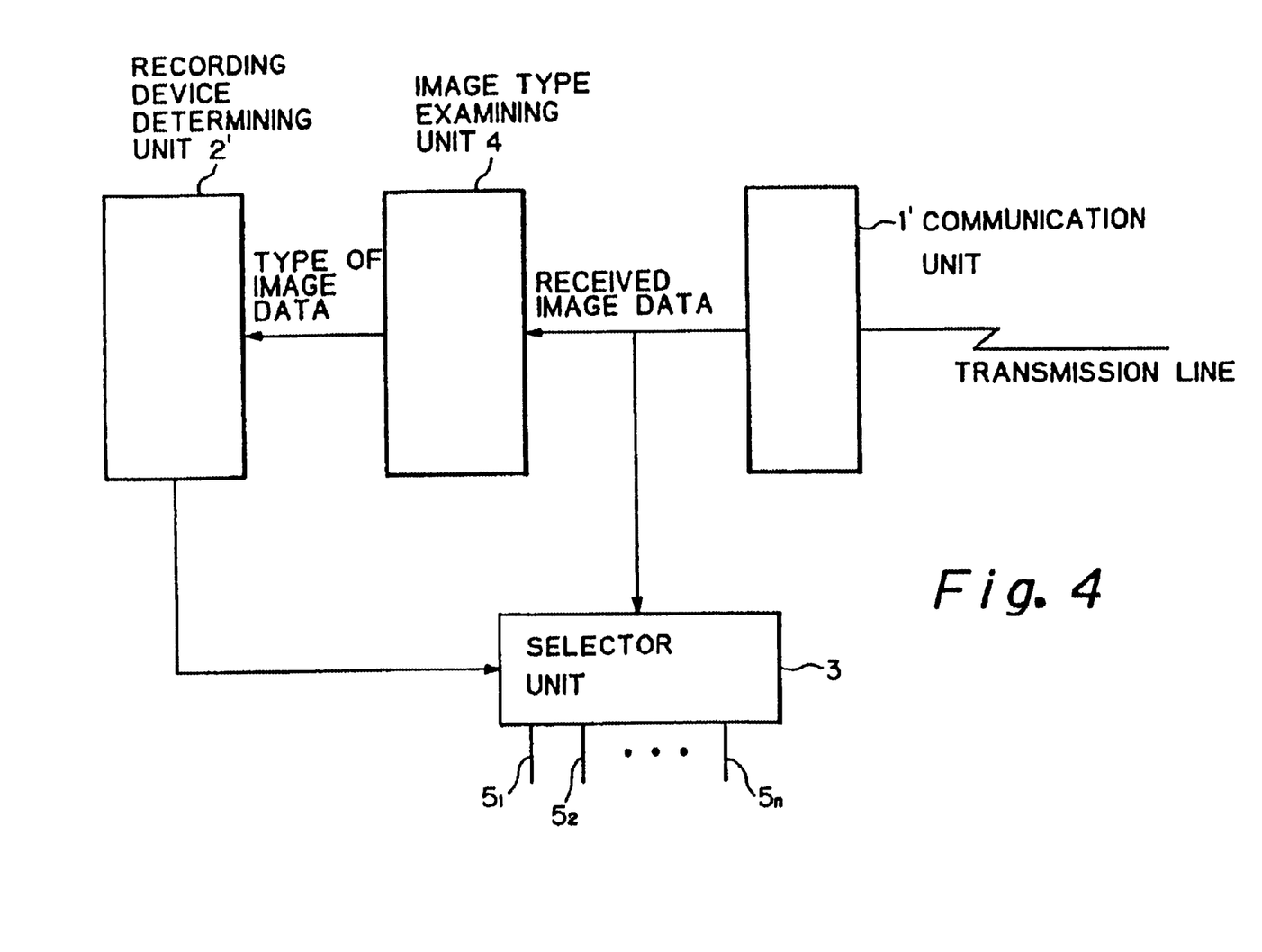
FIG. 4 is a diagram illustrating the basic construction of the facsimile apparatus according to the fourth aspect of the present invention.

FIG. 4 is a diagram illustrating the basic construction of the facsimile apparatus according to the fourth aspect of the present invention. In FIG. 4, reference numeral 1' denotes a communication unit, 2' denotes a recording device determining unit, 3 denotes a selector unit, 4 denotes an image data examining unit, and $5i$ (i=1 to n) each denote a data output port for allowing a connection with a recording device (not shown) to pass therethrough image data so that the image data is supplied to the recording device. The functions of these units are described in the SUMMARY OF THE INVENTION. The construction and the operation of the fourth aspect of the present invention are the same as those of the first aspect of the present invention, except that the information on the type of the image data is not received by the facsimile apparatus, and the type of the image data is determined by the image type examining unit 4.

Figure 5:
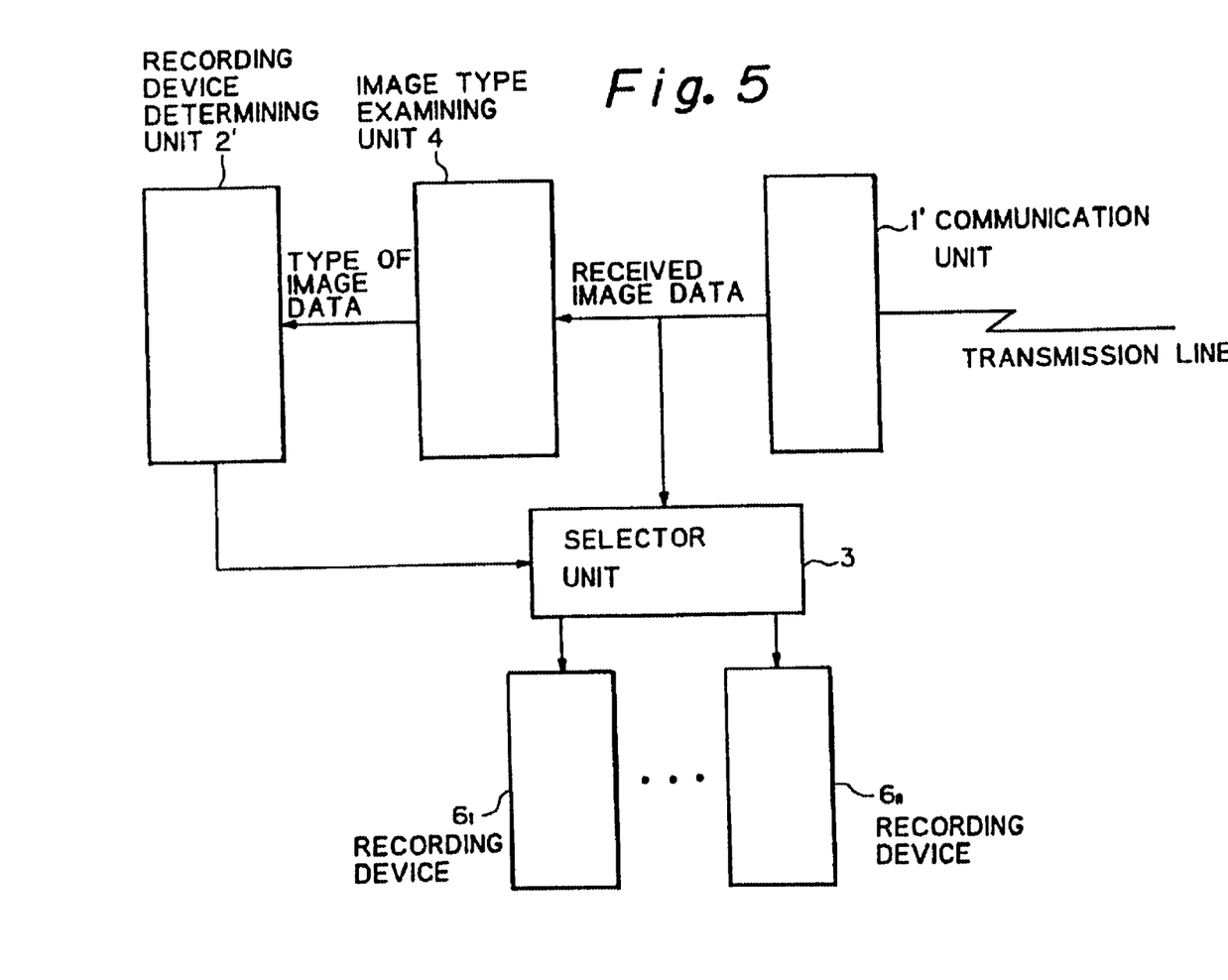
FIG. 5 is a diagram illustrating the basic construction of the facsimile apparatus according to the fifth aspect of the present invention.

FIG. 5 is a diagram illustrating the basic construction of the facsimile apparatus according to the fifth aspect of the present invention. The functions of these units are described in the SUMMARY OF THE INVENTION. The construction and the operation of the fifth aspect of the present invention are the same as those of the second aspect of the present invention except that the information on the type of the image data is not received by the facsimile apparatus, and the type of the image data is determined by the image type examining unit 4.

Figure 6:
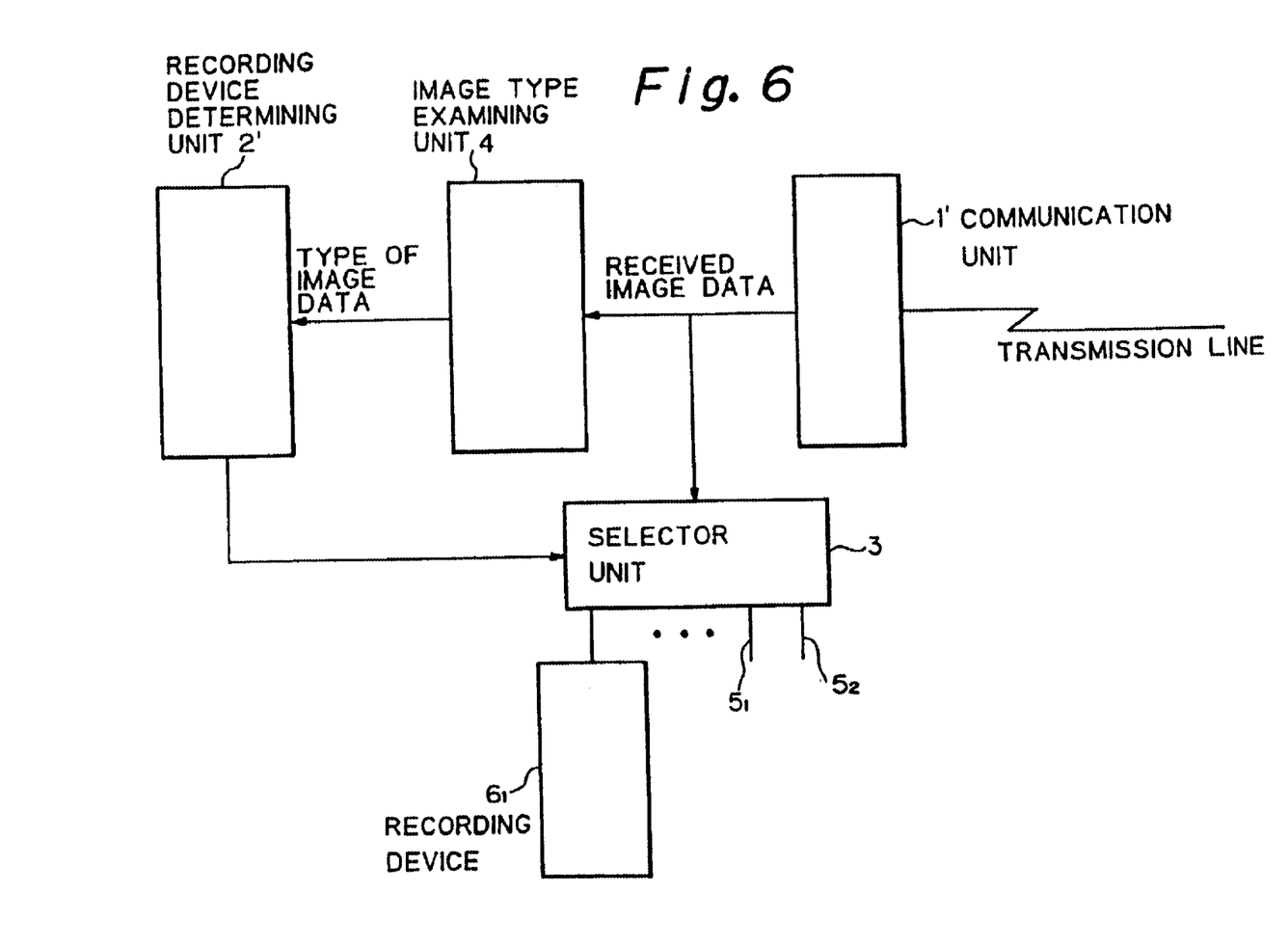
FIG. 6 is a diagram illustrating the basic construction of the facsimile apparatus according to the sixth aspect of the present invention.

FIG. 6 is a diagram illustrating the basic construction of the facsimile apparatus according to the sixth aspect of the present invention. The functions of these units are described in the SUMMARY OF THE INVENTION. The construction and the operation of the sixth aspect of the present invention are the same as those of the third aspect of the present invention, except that the information on the type of the image data is not received by the facsimile apparatus, and the type of the image data is determined by the image type examining unit 4.

Figure 7:
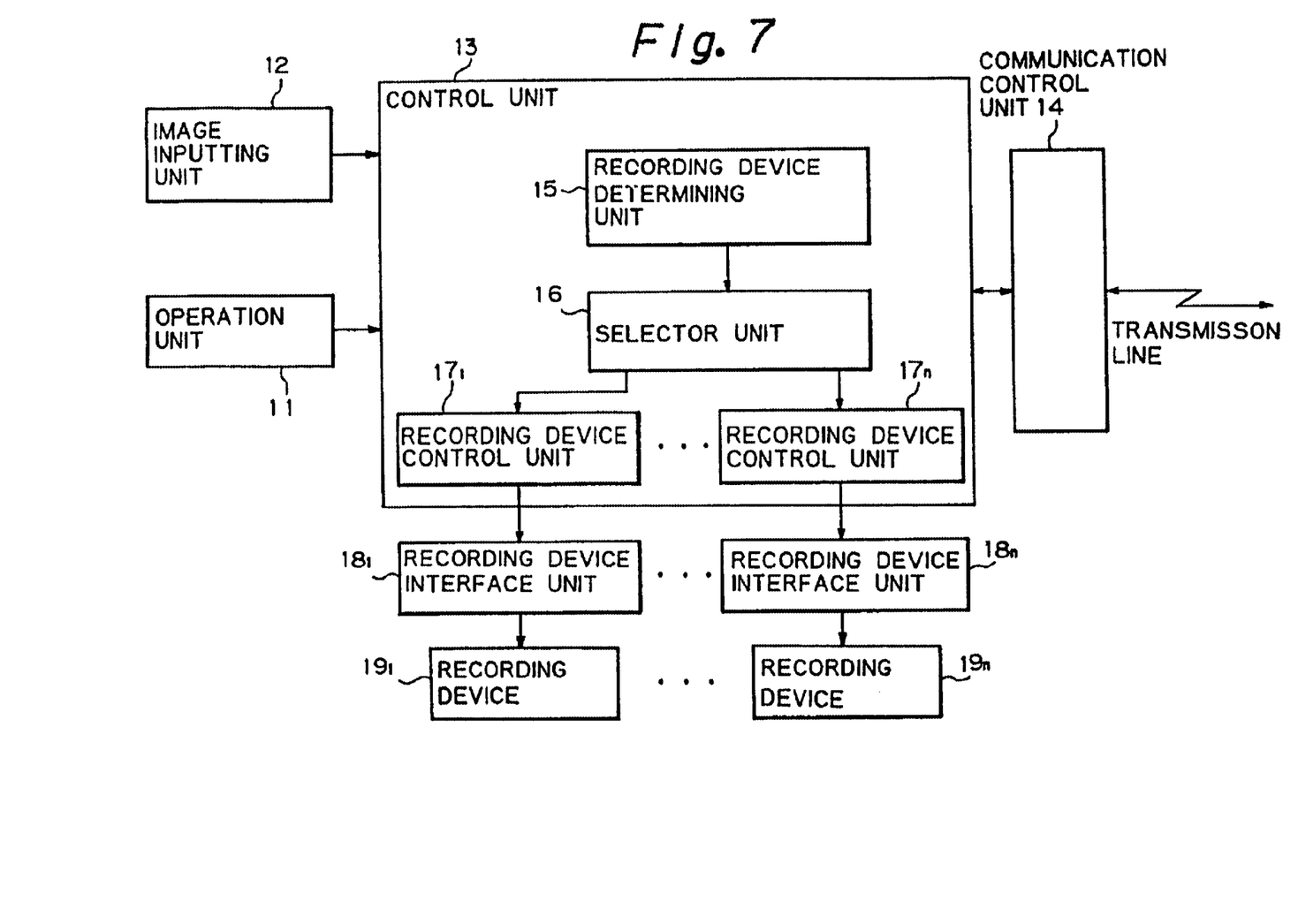
FIG. 7 is a diagram illustrating the construction of accordance with an facsimile apparatus in the embodiment of the present invention.

Embodiment (FIG. 7)

FIG. 7 is a diagram illustrating the construction of the facsimile apparatus in accordance with an embodiment of the present invention. In FIG. 7, reference numeral 11 denotes an operation unit, 12 denotes an image inputting unit, 13 denotes a control unit, 14 denotes a communication control unit. The image inputting unit 12 is provided for inputting (reading) image data for transmitting the image data by facsimile communication. The operation unit 11 comprises, for example, a keyboard and an LCD (liquid crystal display), and is provided for an operator to input a command and for displaying information on the facsimile communication. The communication unit 14 transmits and receives image data through a transmission line. The control unit 13 comprises an MPU (not shown), and controls all the operations of the facsimile apparatus. The control unit 13 further comprises a plurality of recording device control units $17_1 \ldots 17_n$ (software units), each for controlling a recording device (for example, a printer or plotter) when the recording device $19i$ (i=1 to n) is connected to or contained in the facsimile apparatus. That is, a plurality of recording devices $19_1 \ldots 19_n$ can be connected to or are contained in the facsimile apparatus according to the present invention. All or a portion of the plurality of recording devices $19_1 \ldots 19_n$ can be contained in the facsimile apparatus, and one or more data output ports can be provided in the facsimile apparatus for connecting the recording devices which are not contained in the facsimile apparatus. The interface units $18_1 \ldots 18_n$ for the recording devices $19_1 \ldots 19_n$ can also be provided in or connected to the facsimile apparatus, and the recording devices $19_1 \ldots 19_n$ are connected to the control unit 13 through the recording device interface units $18_1 \ldots 18_n$. According to the above-mentioned first to sixth aspects of the present invention, the control unit 13 determines one of the plurality of recording devices $19_i \ldots 19_n$, as a recording device by which the image data received by the communication control unit 14 is to be recorded, and the control unit 13 further comprises a selector unit 16 for activating one of the plurality of recording device control units $17_1 \ldots 17_n$ corresponding to the identified recording device, and supplying the image data to the identified recording device.

Figure 8:
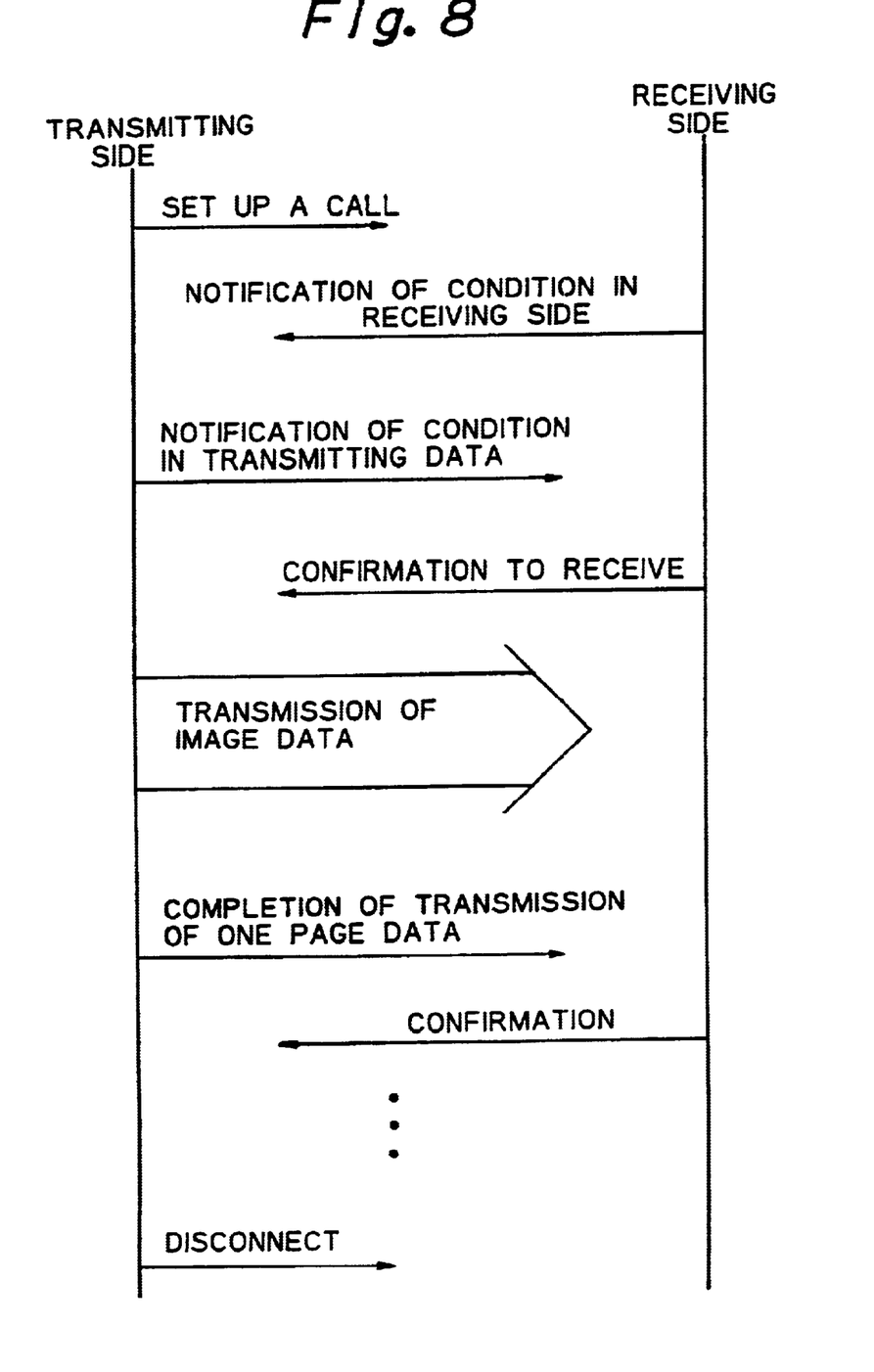
FIG. 8 is a sequence diagram indicating a flow of an operation of transmitting image data by the facsimile apparatus according to the present invention.

Transmission of Type of Image Data (FIG. 8)

According to the first, second, and third aspects of the present invention, information on the type of the image data is transmitted together with the image data. FIG. 8 is a sequence diagram indicating a flow of an operation of transmitting image data by the facsimile apparatus according to the present invention. Only an outline of an actual transmission sequence is indicated in FIG. 8, and explained below although the transmission is carried out in accordance with the CCITT recommendation T.30. As indicated in FIG. 8, a signal for setting up a call is transmitted from a facsimile apparatus on the transmitting side to a facsimile apparatus on the receiving side. Then, a condition on the receiving side, for example, indicating a maximum resolution of a plurality of printers, whether a color printer is connected to the facsimile apparatus, or the like, is transmitted from the facsimile apparatus on the receiving side to the facsimile apparatus on the transmitting side. This condition on the receiving side is transmitted as "Non Standard Facilities" in accordance with the CCITT recommendation T.30. The facsimile apparatus on the transmitting side then transmits a condition on the transmitting side to the facsimile apparatus on the receiving side. This condition on the transmitting side is transmitted as "Non Standard Facilities Command" in accordance with the CCITT recommendation T.30, and can contain the above-mentioned information on the type of image data to be transmitted. The information may include a code indicating a resolution of the image data, for example, 200 dpi×400 dpi, and/or a code whether the image data is color data or monochrome data, or the like.

Receiving the condition, for example, when a color printer is connected to the facsimile apparatus on the receiving side, and the above information indicates that the image data transmitted thereto is color image data, the control unit 13 in the facsimile apparatus determines the color printer as a recording device by which the image data is to be recorded, and activates the recording device control unit corresponding to the color printer. This is realized by a software unit indicated as a recording device determining unit 15 in FIG. 7, corresponding to the above-mentioned recording device determining unit 2 in the first, second, and third aspects of the present invention. Or, when the facsimile apparatus on the receiving side connects two printers capable of printing image data with high (for example, 400 dpi) and low (for example, 200 dpi) resolutions, respectively, and the information indicates that transmitted image data has a high (400 dpi) resolution, the control unit 13 in the facsimile apparatus determines the printer of the high resolution as a recording device by which the image data is to be recorded, and activates the recording device control unit corresponding to the printer of the high resolution. Then, the facsimile apparatus on the receiving side returns a "Confirmation to Receive" signal to the facsimile apparatus on the transmitting side. After receiving the "Confirmation to Receive" signal, the above image data is transmitted from the transmitting side to the receiving side. The facsimile apparatus on the receiving side transfers the above-received image data to the above-determined printer.

Thus, according to the present invention, an optimum paper-recording method can be automatically selected according to a type of received image, to improve economic and practical efficiency.

Figure 9:
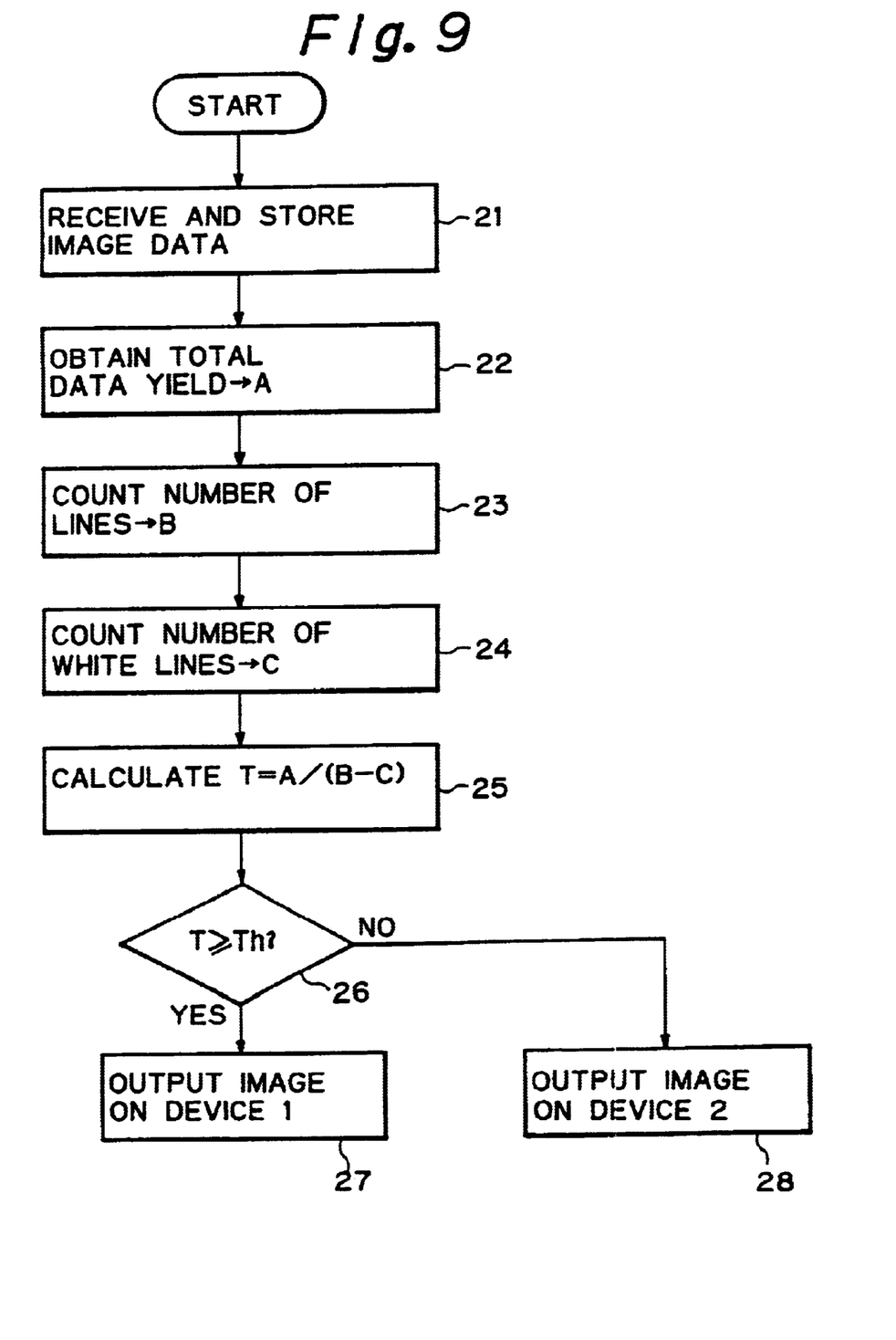
FIG. 9 is a flowchart illustrating the operation for determining a quality level of the received image data, in accordance with the embodiment of the present invention.
Figure 10:
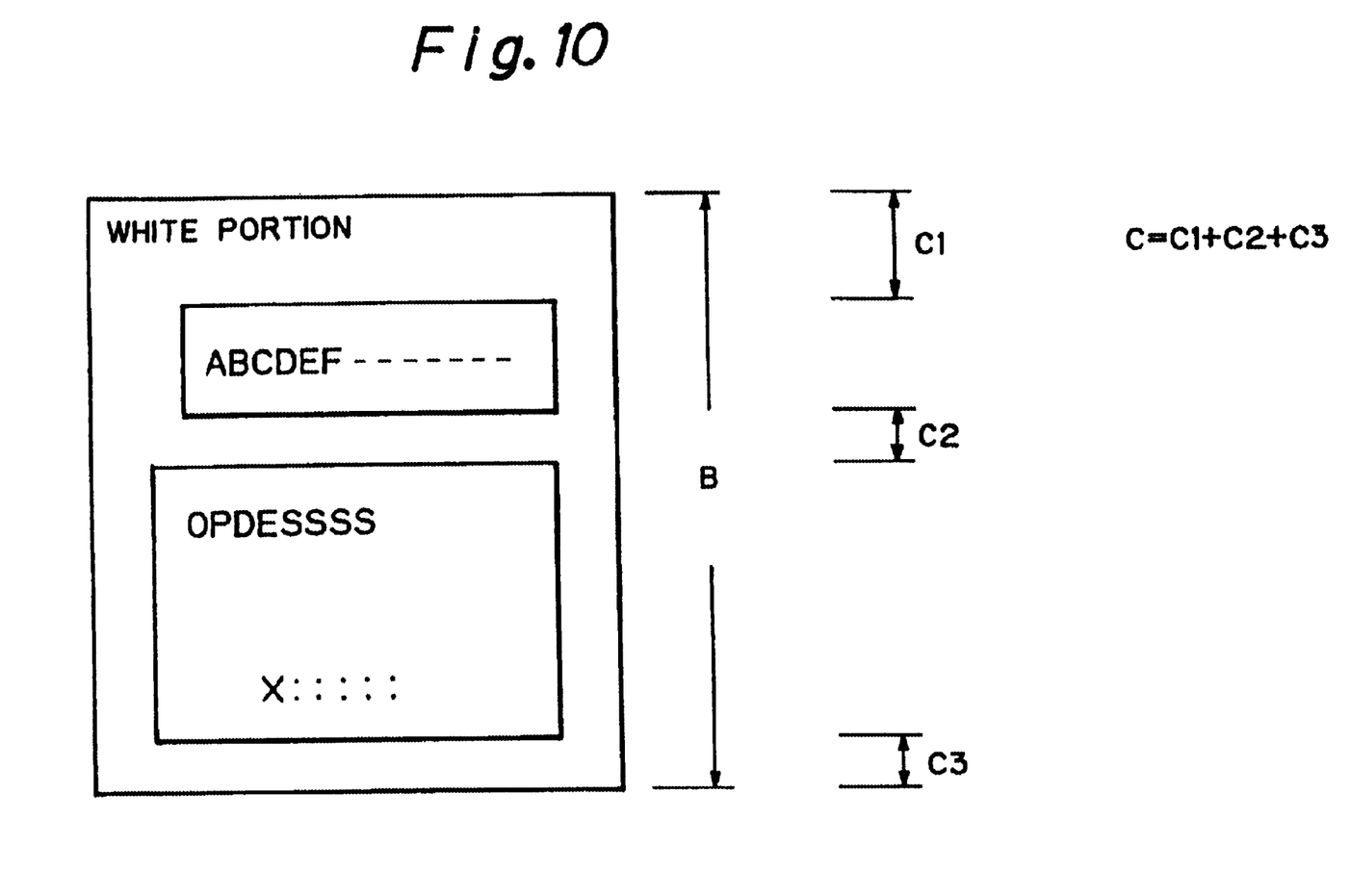
FIG. 10 illustrates an example of an image subject to the examination of FIG. 9.

Image Type Detection (FIGS. 9 and 10)

According to the fourth, fifth, and sixth aspects of the present invention, the control unit 13 contains a software unit for examining the received image data to determine the type of the image data. In the embodiment of the present invention, an optimum or desirable resolution of the image data is determined as the type of the image data. FIG. 9 is a flowchart illustrating the operation for determining a quality level of the received image data, in accordance with the embodiment of the present invention, and FIG. 10 illustrates an example image subject to the examination of FIG. 9.

In the operation of FIG. 9, the (compressed) image data received by the communication control unit 14, is stored in a memory in step 21; a total data yield A of the image data is obtained in step 22; a total number B of lines in one sheet of the image data is obtained in step 23; a white number C of white lines in one sheet of the image data is obtained in step 24; and then, in step 25, a difference B−C between the total number of lines and the number of white lines is obtained, and the total data yield A is divided by the difference B−C to obtain an evaluation value T=A/(B−C) for indicating the complexity of the image data. Then, in step 26, the evaluation value T is compared with at least one predetermined threshold value Th to determine the quality level of the image continuous sheet data. The above line number B can be counted by detecting the EOL (end of line) code transmitted with the image data.

Since image data transmitted by facsimile communication is encoded by run-length limited coding, a total data yield is large when the image is complex. The above division by the difference B−C is carried out for taking only an area of a sheet in which an effective portion of the image is located, into consideration. For example, A≈40 KB and B=2,346 in the case of a high resolution reading (eight lines per millimeter) of A4 size paper with G3 mode, and T=40,000÷(2,346−2,346×0.3)=24 when 30% of the total lines are white. When the above threshold value is set to 48, The above image data of the evaluation value T=24 is determined as less complex image data, and the image data is determined to be recorded by a printer of low resolution. When the obtained evaluation value is larger than the above threshold value Th=48, the image data is determined to be recorded by a printer of high resolution.

Other Information on Type of Image Data

Further, when the facsimile apparatus connects printers in which the recording of image is carried out on cut paper and rolled paper, respectively, the above total number of lines can be examined to determine whether or not the total number B of lines in one continuous sheet of the image data is within the maximum printable number of lines in one continuous sheet of cut paper. When the total number B of lines in one continuous sheet of the image data is determined to be larger than the maximum printable number of lines in one continuous sheet, the control unit 13 selects the printer using the rolled paper.

What is claimed is:

1. A facsimile apparatus, comprising:

communication means for receiving and transmitting through a single line, image data and information specifying a type of the image data, the information indicating a resolution of the image data;

a plurality of data output ports, each for allowing a connection with one of a plurality of recording devices to pass the image data therethrough based on the information indicating a resolution, so that the image data is supplied to one of the plurality of recording devices;

recording device determining means for receiving the information indicating a resolution and determining one of said data output ports which is connected to a corresponding one of said plurality of recording devices for recording the image data, based on the information indicating a resolution of the image data; and selector means for outputting the image data received by said communication means through said one of said data output ports determined by said recording device determining means.

2. A facsimile apparatus, comprising:

communication means for receiving and transmitting through a single line, image data and information specifying a type of the image data, the information indicating a resolution of the image data;

a plurality of recording devices, each for recording the image data received by said communication means when the recording device receives the image data;

recording device determining means for receiving the information indicating a resolution and identifying one of said recording devices as a recording device for recording the image data, based on the information indicating a resolution; and selector means for transferring the image data received by said communication means to said recording device identified by said recording device determining means.

3. A facsimile apparatus, comprising:

communication means for receiving and transmitting through a single line, image data and information specifying a type of the image data, the information indicating a resolution of the image data;

at least one data output port for allowing a connection with at least one first recording device to pass the image data therethrough, so that the image data is supplied to the at least one first recording device;

at least one second recording device for recording the image data received by said communication means when the second recording device receives the image data;

recording device determining means for receiving the information indicating a resolution and identifying one recording device from among the at least one first recording device and said at least one second recording device, based on the information indicating a resolution; and selector means, coupled to said at least one data output port and said at least one second recording device, for outputting the image data received by said communication means, based on the determination by said recording device determining means, in accordance with the information indicating a resolution and identifying a recording device from among at least one of the first and second recording devices, through said at least one data output port corresponding to the at least one first recording device, or to said at least one second recording device.

4. A facsimile apparatus, comprising: communication means for receiving and transmitting through a single line, image data;

a plurality of data output ports for allowing connection with respective recording devices to pass the image data therethrough, so that the image data is supplied to the corresponding recording devices;

image type determining means for examining the image data received by said communication means to determine a type of the image data, said image type determining means determining a resolution of the image data as the type of image data;

recording device determining means for identifying one of said plurality of data output ports which can be connected to one of the recording devices based on the resolution of the image data determined by said image type determining means; and selector means for outputting the image data received by said communication means through the one of said data output ports identified by said recording device determining means in accordance with the resolution of the image data.

5. A facsimile apparatus according to claim 4, wherein said image type determining means comprises:

image data storing means for storing the image data received by said communication means;

total data yield obtaining means for obtaining a total data yield of the image data;

total number-of-lines obtaining means for obtaining a total number of lines in the image data;

white number-of-lines obtaining means for obtaining a number of white lines in the image data;

data complexity obtaining means for obtaining an evaluation value for indicating complexity of the image data by obtaining a difference between said total number of lines and said number of white lines, and then obtaining an evaluation value by dividing said total data yield by said difference; and comparing means for comparing said evaluation value with at least one predetermined threshold value to determine the resolution of the image data.

6. A facsimile apparatus, comprising:

communication means for receiving and transmitting through a single line, image data;

a plurality of recording devices for recording the image data received by said communication means when the recording devices receive the image data;

image type determining means for examining the image data received by said communication means to determine a type of the image data, said image type determining means determining a resolution of the image data as the type of image data;

recording device determining means for identifying one of said recording devices, as the recording device for recording the image data, based on the resolution of the image data determined by said image type determining means; and selector means for transferring the image data received by said communication means to the recording device identified by said recording device determining means in accordance with the resolution of the image data.

7. A facsimile apparatus according to claim 6, wherein said image type determining means comprises:

image data storing means for storing the image data received by said communication means;

total data yield obtaining means for obtaining a total data yield of the image data;

total number-of-lines obtaining means for obtaining a total number of lines in the image data;

white number-of-lines obtaining means for obtaining a number of white lines in the image data;

data complexity obtaining means for obtaining an evaluation value for indicating complexity of the image data by obtaining a difference between said total number of lines and said number of white lines, and then obtaining an evaluation value by dividing said total data yield by said difference; and comparing means for comparing said evaluation value with at least one predetermined threshold value to determine the resolution of the image data.

8. A facsimile apparatus, comprising:

communication means for receiving and transmitting through a single line, image data;

at least one data output port for allowing a connection with at least one first recording device to pass the image data therethrough, so that the image data is supplied to the at least one first recording device;

at least one second recording device for recording the image data received by said communication means when said at least one second recording device receives the image data;

image type determining means for examining the image data received by said communication means to determine a type of the image data, said image type determining means determining a resolution of the image data as the type of image data;

recording device determining means for identifying one recording device from among the at least one first recording device and said at least one second recording device, based on the resolution of the image data determined by said image type determining means; and selector means, coupled to said at least one data output port and said at least one second recording device, for outputting the image data received by said communication means, based on the determination by said recording device determining means in accordance with the resolution of the image data, through one of said at least one data output port corresponding to the at least one first recording device or said at least one second recording device.

9. A facsimile apparatus according to claim 8, wherein said image type determining means comprises:

image data storing means for storing the image data received by said communication means;

total data yield obtaining means for obtaining a total data yield of the image data;

total number-of-lines obtaining means for obtaining a total number of lines in the image data;

white number-of-lines obtaining means for obtaining a number of white lines in the image data;

data complexity obtaining means for obtaining an evaluation value for indicating complexity of the image data by obtaining a difference between said total number of lines and said number of white lines, and then obtaining an evaluation value by dividing said total yield by said difference; and comparing means for comparing said evaluation value with at least one predetermined threshold value to determine the resolution of the image data.

10. A method for operating facsimile equipment, comprising the steps of:

a) receiving image data through a single line;

b) determining a resolution of the image data by examining the image data;

c) automatically selecting one of a plurality of different types of recording devices based on the determined resolution; and d) automatically providing the image data to the selected one of the recording devices.

11. A method according to claim 10, wherein said step of determining the resolution includes the substeps of:

determining a total data yield for the image data;

determining a total number of lines in the image data;

determining a number of white lines in the image data;

determining a difference value by calculating the difference between the total number of lines and the number of white lines;

determining an evaluation value by dividing the total data yield by the difference value; and comparing the evaluation value with at least one predetermined threshold value to determine the resolution of the image data.

12. A method for determining a quality level of image data, comprising:

storing the image data;

obtaining a total data yield of the image data;

obtaining a total number of lines in the image data;

obtaining a number of white lines in the image data;

obtaining an evaluation value for indicating complexity of the image data by obtaining a difference between the total number of lines and the number of white lines, and then obtaining an evaluation value by dividing the total data yield by the difference; and comparing the evaluation value with at least one predetermined threshold value to determine the resolution of the image data.

* * * * *

UNITED STATES PATENT AND TRADEMARK OFFICE
CERTIFICATE OF CORRECTION

PATENT NO. : 6,674,548 B1
DATED : January 6, 2004
INVENTOR(S) : Norio Kanemitsu

It is certified that error appears in the above-identified patent and that said Letters Patent is hereby corrected as shown below:

Title page,
Item [73], Assignee, change "Fujitsu Limited, Kawasaki (JP)" to -- Matsushita Graphic Communications Systems, Inc., Tokyo (JP) --.

Signed and Sealed this

Twenty-seventh Day of July, 2004

JON W. DUDAS
*Acting Director of the United States Patent and Trademark Office*